United States Patent [19]

Terai et al.

[11] 4,260,170
[45] Apr. 7, 1981

[54] MOTORCYCLE HAVING A LEADING AXLE TYPE FRONT FORK ASSEMBLY

[75] Inventors: Kazuo Terai, Hamamatsu; Takeshi Nagase, Shizuoka, both of Japan

[73] Assignee: Yamaha Hatsudoki Kabushiki Kaisha, Iwata, Japan

[21] Appl. No.: 50,502

[22] Filed: Jun. 20, 1979

[30] Foreign Application Priority Data

Jun. 24, 1978 [JP] Japan .................................. 53-77120

[51] Int. Cl.³ .............................................. B62K 21/02
[52] U.S. Cl. .................................................. 280/276
[58] Field of Search ................ 180/219; 280/276, 279, 280/277

[56] References Cited

U.S. PATENT DOCUMENTS

| | | | |
|---|---|---|---|
| 3,822,755 | 7/1974 | Hine | 180/190 |
| 4,012,055 | 3/1977 | Ottow | 280/276 |
| 4,184,695 | 1/1980 | Roe et al. | 280/277 |

FOREIGN PATENT DOCUMENTS

| | | | |
|---|---|---|---|
| 1680573 | 5/1966 | Fed. Rep. of Germany | 280/276 |
| 985372 | 7/1951 | France | 280/276 |
| 48-98540 | 12/1973 | Japan . | |
| 51-23937 | 2/1976 | Japan . | |
| 53-15266 | 2/1978 | Japan . | |

*Primary Examiner*—John A. Pekar
*Attorney, Agent, or Firm*—Fleit & Jacobson

[57] ABSTRACT

Motorcycle having a head pipe for mounting a front fork assembly for movement about a steering axis which is inclined rearwardly with respect to a vertical line to define a caster angle. The front fork assembly has an axis which is inclined rearwardly with respect to a vertical line by an angle smaller than the caster angle. The front fork assembly supports the front axle along the front side at a position upwardly distant from the lower end thereof.

2 Claims, 6 Drawing Figures

FIG. 4(a)
FIG. 4(b)
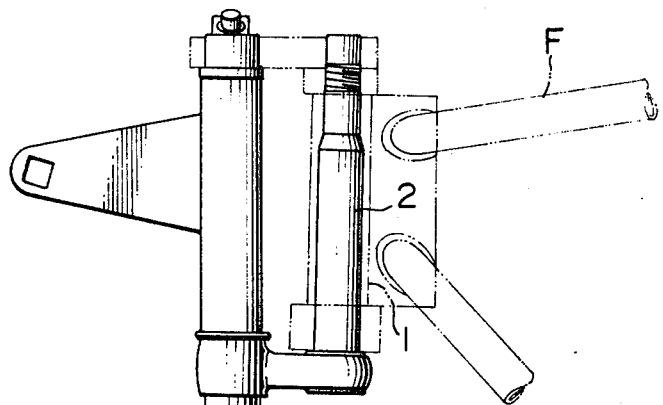
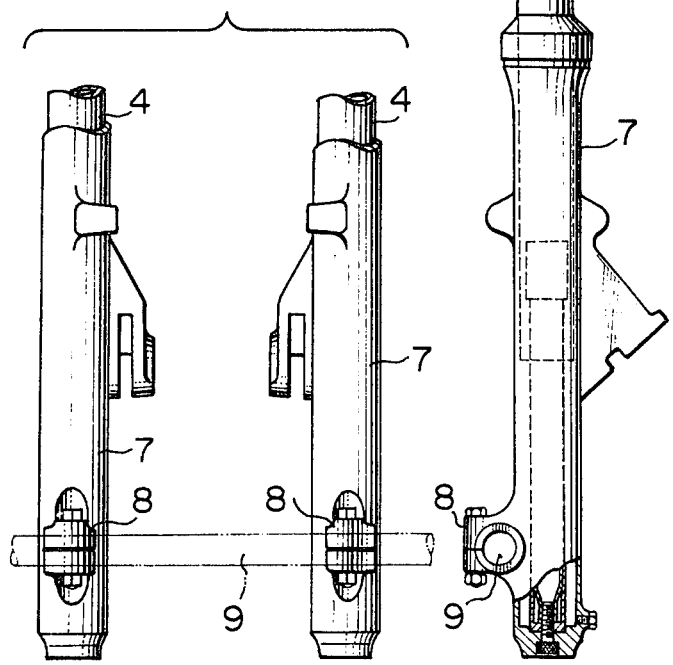

MOTORCYCLE HAVING A LEADING AXLE TYPE FRONT FORK ASSEMBLY

The present invention relates to motorcycles and more particularly to motorcycles having front fork assemblies of a leading axle type.

In motorcycles, there are several major factors which govern the controllability. One of such factors is a "caster angle" which is defined as an angle between a vertical line and the steering axis of the front fork assembly. Another factor is a so-called "trail" which is defined as a distance between the point of intersection of the vertical line passing through the axis of the front axle with the ground surface and a point of intersection of the steering axis with the ground surface. In general, where the caster angle and the trail are of small values, there is an adverse effect of the directional stability of the motorcycle, however, excessively large caster angle and trail will disturb steerability. Usually, the caster angle and the trail have been properly determined so that a desired controllability is obtained.

Conventional front fork assemblies for motorcycles are classified into two different types, one being a center axle type in which the front axle is located on the axis of the front fork assembly and the other being an offset axle type in which the front axle is offset forwardly or rearwardly with respect to the axis of the front fork assembly. Where the front axle is forwardly offset with respect to the axis of the front fork assembly, it is generally called as a leading axle type, whereas when the offset is in the opposite direction, it is called as a trailing axle type.

The offset axle type front fork assembly is considered as being advantageous as compared with the center axle type front fork assembly in respect of shock absorbing property since the location of the front axle can be appropriately determined so as to obtain an increased stroke of the shock absorber which is incorporated in the front fork assembly. Thus, from the viewpoint of dynamic property of the front fork assembly and also of appearance, it may sometimes be required, when a model change is effected to a motorcycle having a center axle type front fork assembly, to substitute the front fork assembly which one of a leading axle type. In this instance, however, if the front fork assembly is simply replaced without any change in the caster angle, the result will be that the front axle is shifted in the forward direction so that there will be a forward shift of the point of intersection of the vertical line passing through the axis of the front axle with the ground surface. The forward shift of the aforementioned point of intersection causes a decrease in the trail since the caster angle is maintained without any change and therefore there is no change in the point of intersection of the steering axis with the ground surface. There will therefore be an increase in the wheel base, and the weight distribution between the front and rear wheels will also be changed. Since the original model having the center axle type front fork assembly would have been so designed that it possessed appropriate directional stability and the steering property, such properties would become dissatisfactory in the new model having the leading axle type front fork assembly.

It is therefore an object of the present invention to provide a motorcycle having a leading axle type front fork assembly which can take the position of a center axle type front fork assembly without any change in the caster angle, the trail, the wheel base and the weight distribution between the front and rear wheels.

Another object of the present invention is to provide a motorcycle having a leading axle type front fork assembly which can be mounted with an adequately large trail as in a motorcycle having a center axle type front fork assembly.

According to the present invention, the above and other objects can be accomplished by a motorcycle comprising a frame, a front fork assembly having a front side and a lower end portion and mounted on the frame through a steering head which connects the front fork assembly to the frame for steering movement about a steering axis which is inclined rearwardly with respect to a vertical line to define a caster angle, a front wheel mounted on the front fork assembly through a front axle, said front wheel being inclined rearwardly with respect to a vertical line by an angle smaller than the caster angle, said front axle being located along the front side of and above the lower end portion of the front fork assembly. According to the features of the present invention, the front axle can be located at a rearward portion as compared with that in a conventional motorcycle having a leading axle type front fork assembly since the front fork assembly is rearwardly inclined by an angle smaller than the caster angle. Therefore, it is possible to substitute a center axle type front fork assembly by a leading axle type assembly without any change in the caster angle while maintaining the originally designed trail, the wheel base and the weight distribution between the front and rear wheels.

The above and other objects and features of the present invention will become apparent from the following descriptions of a preferred embodiment taking reference to the accompanying drawings, in which:

FIG. 4(a) is a side view of the front fork assembly used in the embodiment of FIG. 3;

FIG. 4(b) is a fragmentary front view of the front fork assembly shown in FIG. 4(a); and, FIG. 5 is a perspective view showing the front portion of the motorcycle frame.

Figure 1:
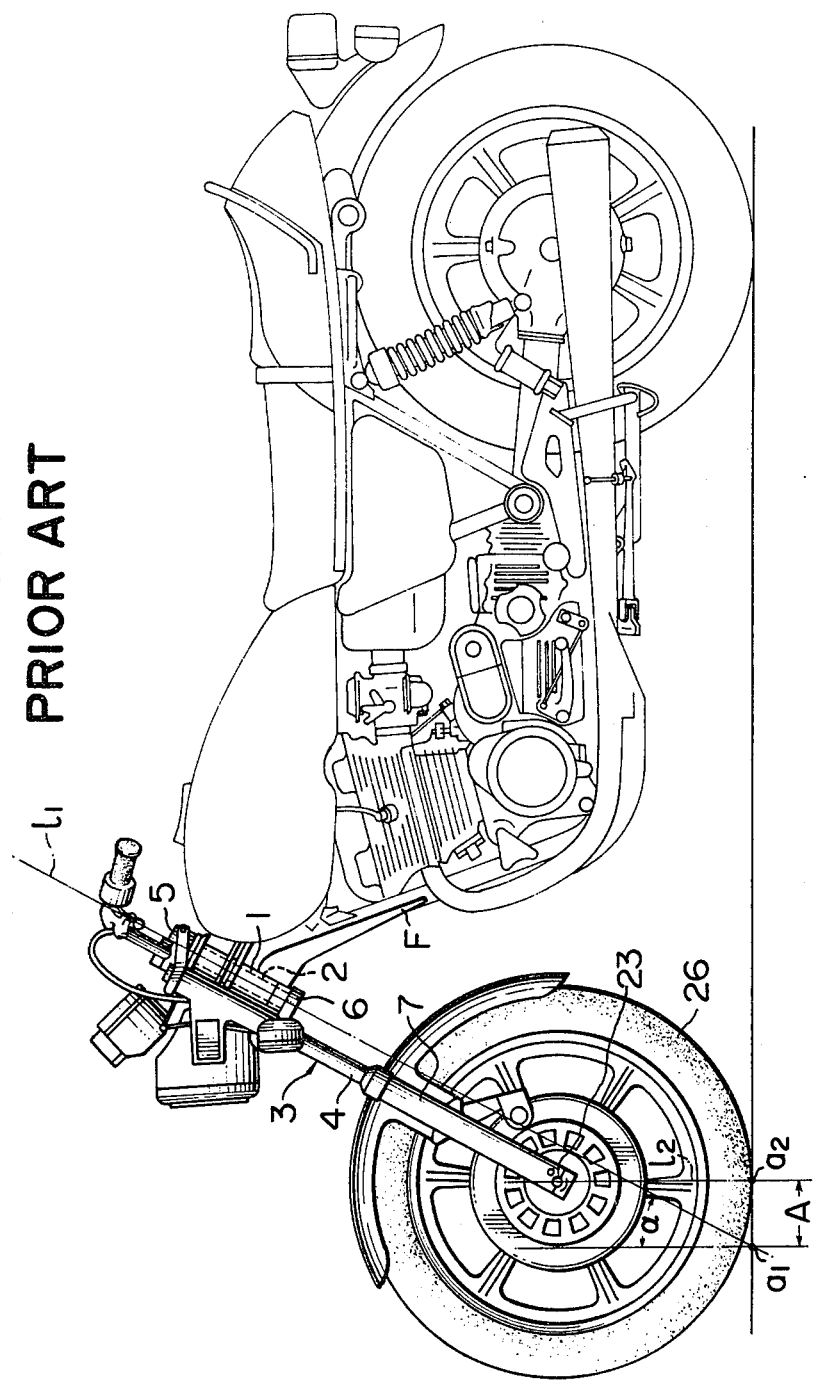
FIG. 1 is a side view of a motorcycle having a center axle type front fork assembly.
Figure 2:
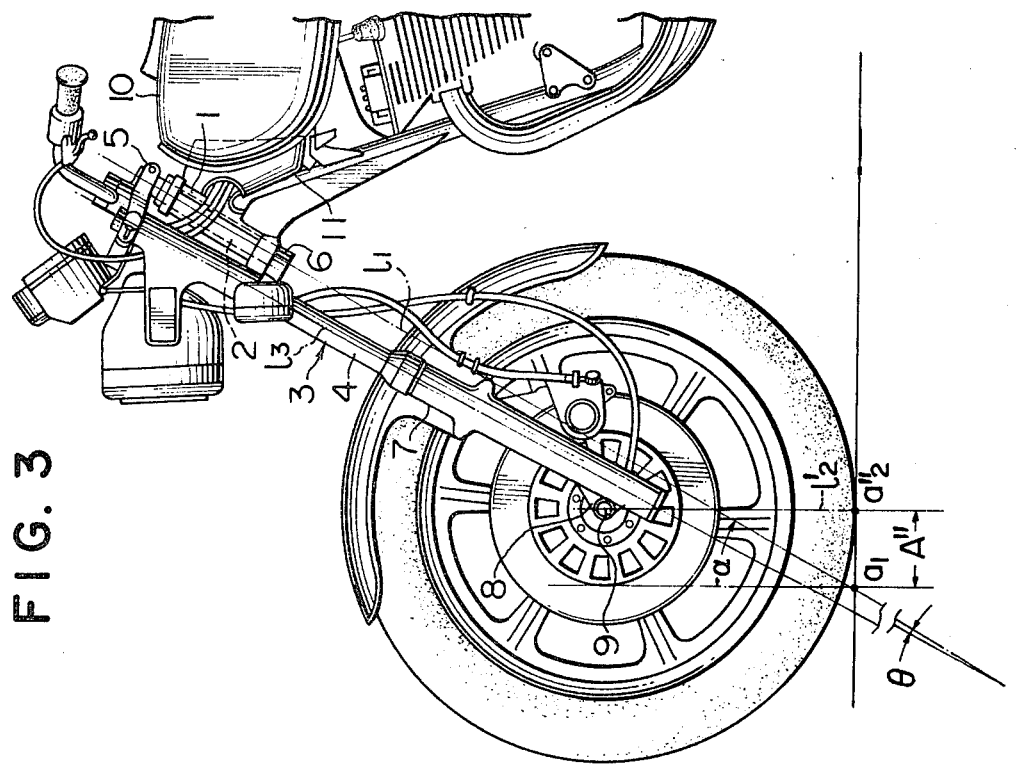
FIG. 2 is an enlarged fragmentary side view of the front portion of the motorcycle shown in FIG. 1.

Referring to the drawings, particularly to FIGS. 1 and 2 the motorcycle shown therein includes a frame F having a steering head or head pipe 1 at the front end thereof. The head pipe 1 supports a front fork assembly 3 for steering movement. For the purpose, the front fork assembly 3 includes a steering shaft 2 which is secured at the upper and lower ends to an upper bracket 5 and a lower bracket 6 and supported by the head pipe 1. The front fork assembly 3 is comprised of a pair of parallel inner tubes 4 which are slidably received by a pair of parallel outer tubes 7 to constitute a telescopic shock absorbing device, and the upper and lower brackets 5 and 6 are mounted on the inner tubes 4. As shown in FIGS. 1 and 2, the head pipe 1 has an axis $l_1$ which may be referred to as a steering axis and inclined rearwardly with respect to a vertical line by a caster angle $\alpha$. The steering axis $l_1$ intesects the ground surface at a point $a_1$.

The front fork assembly 3 carries at the lower end thereof a front wheel 26 through an axle 23 and a vertical line $l_2$ passing through the axis of the axle 23 intersects the ground surface at a point $a_2$ which is the point of contact of the front wheel 26 with the ground surface. Due to the caster angle $\alpha$, the point $a_1$ is located forward of the point $a_2$ so as to define a trail A. As shown in FIG. 2, the front fork assembly 3 has an axis $l_3$ which is substantially parallel with the steering axis $l_1$.

In this type of motorcycle, if the front fork assembly 3 is substituted by a leading axle type assembly in which the front wheel 26 is carried on axle brackets 25 extending forwardly from the lower tubes 7, as shown by phantom lines in FIG. 2, there will be a forward shift of the front wheel 26. Thus, the vertical line passing through the axis of the front axle 23 now intersects the ground surface at a point $a'_2$ which is forwardly shifted with respect to the point $a_2$. Thus, there will be a decrease in the trail as will be readily recognized by comparing A and A' in FIG. 2.

Figure 3:
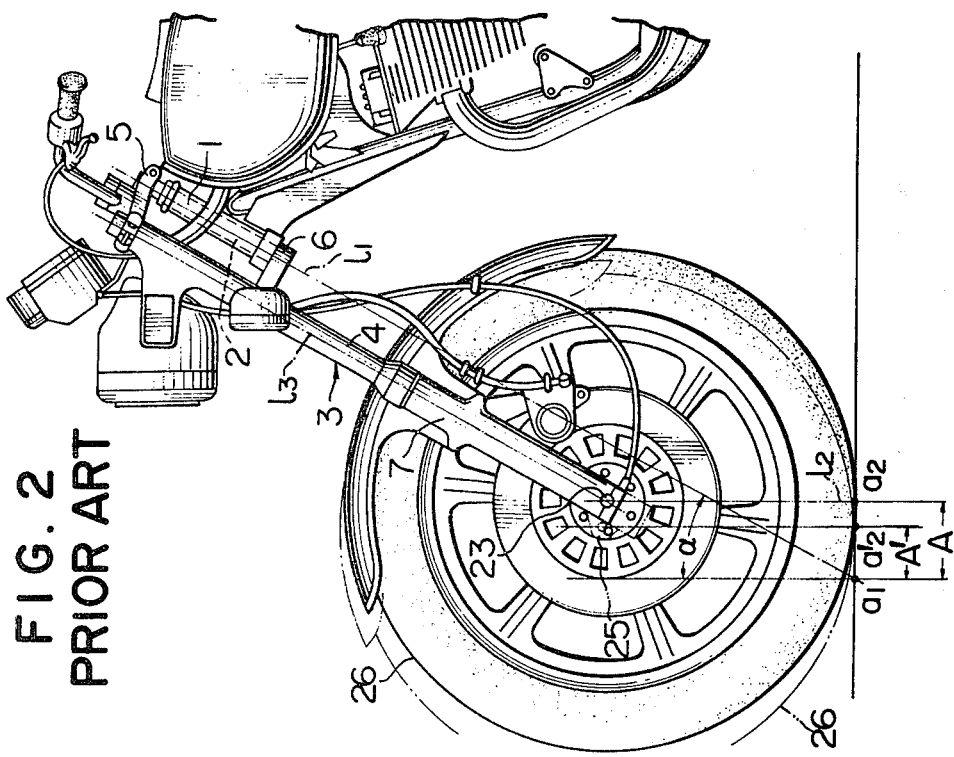
FIG. 3 is a view similar to FIG. 2 but showing one embodiment of the present invention.

Referring now to FIG. 3 which shows an embodiment of the present invention, the front fork assembly 3 has an axis $l_3$ which is inclined rearwardly but by an angle smaller than the caster angle $\alpha$. Thus, the axis $l_3$ of the front fork assembly 3 makes an angle $\theta$ with the steering axis $l_1$. In a preferable example, the angle $\theta$ may be 1.5°.

The outer tubes 7 of the front fork assembly 3 are provided at portions upwardly spaced from the lower ends thereof with axle brackets 8 which are projecting in the forward direction. A front axle 9 is mounted on the front fork assembly 3 so as to extend between the axle brackets 8 on the outer tubes 7.

According to the arrangement, the front wheel 26 and the axle 9 thereof are positioned rearwardly as compared with those in the arrangement of the conventional leading axle type front fork assembly shown by phantom lines in FIG. 2. It is even possible to locate the front axle 9 at the position of the axle 23 in the conventional center axle arrangement. The vertical line $l'_2$ passing through the axis of the axle 9 intersects the ground surface at a point $a''_2$ and the trail A" between the point $a_1$ and the point $a''_2$ may be very close or equal to the trail A in the center axle type assembly. Thus, the controllability can be maintained substantially the same as in the original design having the center axle type front fork assembly.

Figure 5:
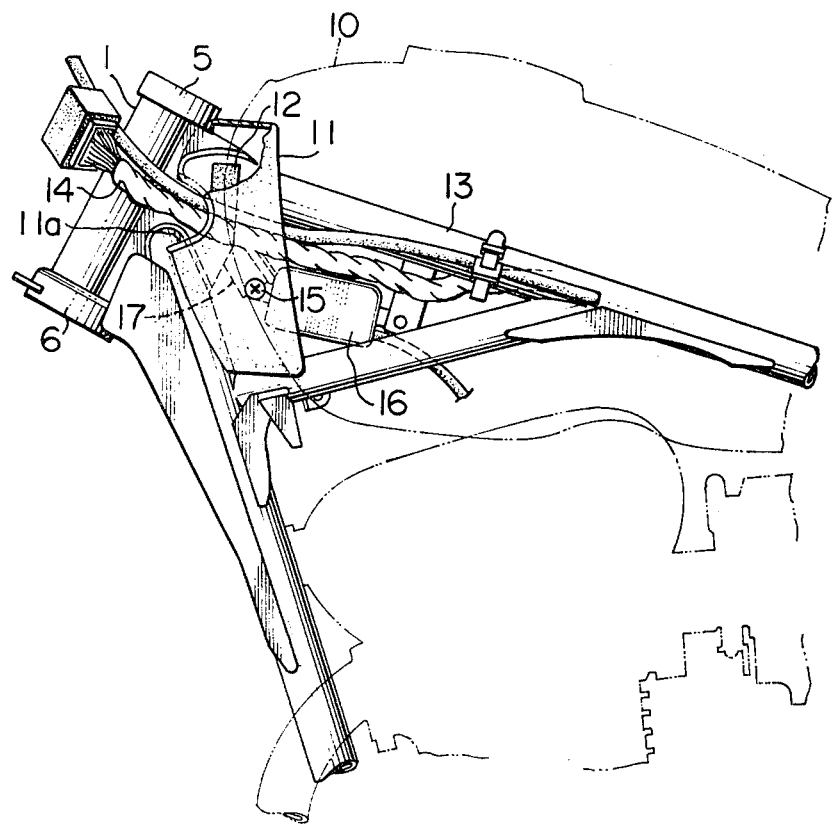

In the arrangement of FIG. 3, it may be desirable to have the front fork assembly 3 spaced from the steering axle $l_1$ at the upper end portion thereof by the same distance as in the conventional center axle arrangement. Then, there may be a problem of interference between the fuel tank 10 and the front fork assembly 3 during a steering operation. In order to eliminate the problem, the position of the fuel tank 10 may be rearwardly shifted. A cover 11 which may be made of a plastic or other suitable material may then be provided as shown in FIG. 5 to cover the front end portion of the frame which may otherwise be exposed due to the rearward shift of the fuel tank 10. The cover 11 is of a U-shaped cross-section having opposite sides attached by means of screws 15 to a bracket 17 which is provided for mounting an ignition coil 16. The opposite sides of the cover 11 are further in engagement with a frame member 13 welded to the head pipe 1 through dampers or cushions pads 12 interposed therebetween. The cover 11 is formed with a cutout or opening 11a for passing a bundle 14 of electric wires therethrough.

The invention has thus been shown and described with reference to a specific embodiment, however, it should be noted that the invention is in no way limited to the details of the illustrated structures but changes and modifications may be made without departing from the scope of the appended claims.

We claim:

1. Motorcycle comprising a frame, a front fork assembly having a front side and a lower end portion and mounted on the frame through a steering head which connects the front fork assembly to the frame for steering movement about a steering axis which is inclined rearwardly with respect to a vertical line to define a caster angle, a front wheel mounted on the front fork assembly through a front axle, said front fork assembly being inclined rearwardly with respect to a vertical line by an angle smaller than the caster angle, said front axle being located along the front side of and above the lower end portion of the front fork assembly so that the front axle is connected with the front fork assembly axially above the lower end thereof.

2. Motorcycle in accordance with claim 1 in which said front fork assembly includes a telescopic shock absorbing device having a pair of parallel inner tubes slidably received by a pair of parallel outer tubes, each of said outer tubes having a front side formed with an axle bracket which is upwardly distant from lower end thereof and adapted for mounting the front axle.

* * * * *